Sept. 24, 1929.　　　C. HUFSCHMIDT　　　1,729,217
POWDERED FUEL FURNACE
Filed July 27, 1927　　　2 Sheets-Sheet 1
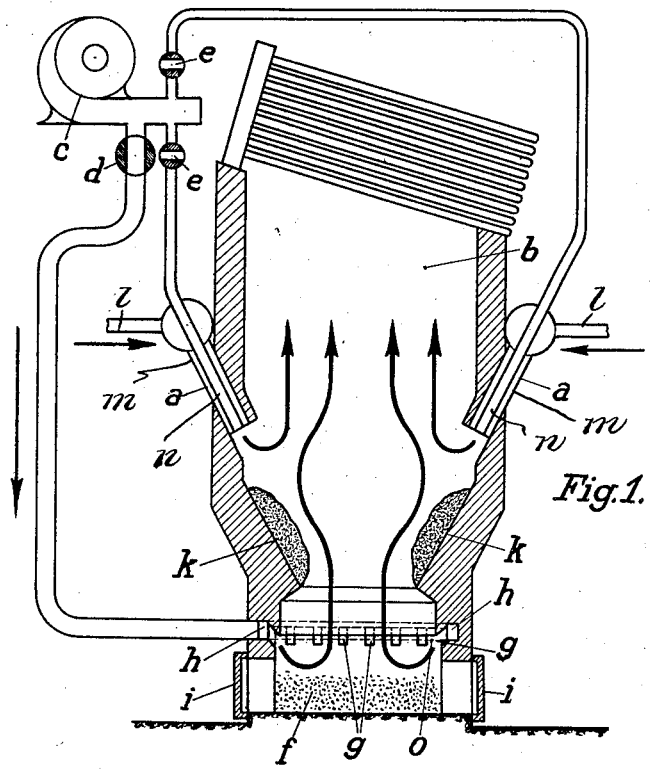
Fig.1.
Fig.3.
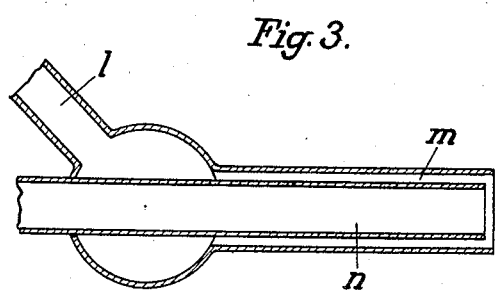
Inventor:
Carl Hufschmidt
By B. Singer atty.

Sept. 24, 1929.  C. HUFSCHMIDT  1,729,217
POWDERED FUEL FURNACE
Filed July 27, 1927  2 Sheets-Sheet 2
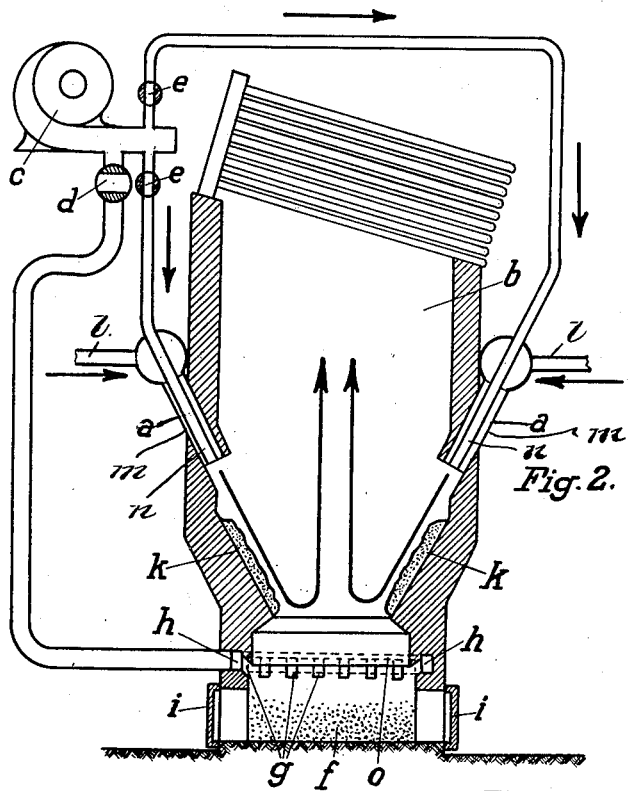
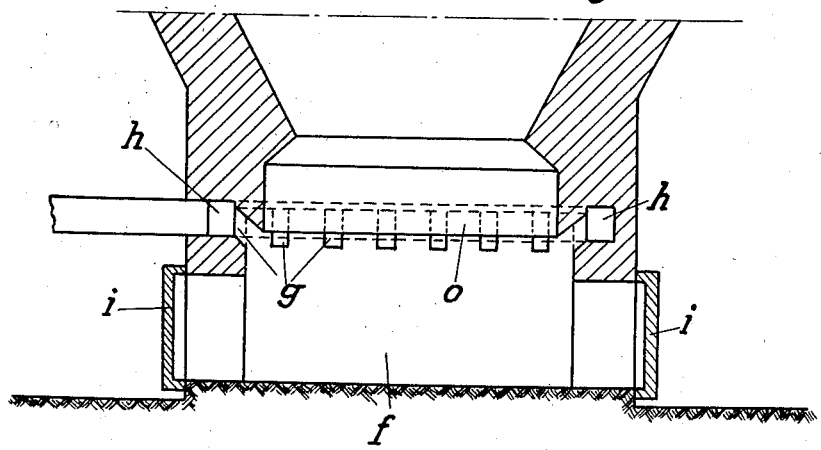
Inventor:
Carl Hufschmidt
By B. Singer
atty.

Patented Sept. 24, 1929.

1,729,217

UNITED STATES PATENT OFFICE

CARL HUFSCHMIDT, OF WESTENFELD, NEAR WATTENSCHEID, GERMANY

POWDERED-FUEL FURNACE

Application filed July 27, 1927, Serial No. 208,816, and in Germany October 3, 1925.

The removal of slag, ash or clinker from the combustion chambers of furnaces using powdered fuel is attended with considerable difficulty, particularly where the furnaces are working continuously. Removal in a liquid state entails injury to the masonry walls due to chemico-mechanical action, and precipitation in a finely granulated state is not always compatible with economic firing, particularly where the load varies. Part of the clinker generally adheres to the walls, particularly the lower portions thereof, and in time obstructs the clinker outlets.

According to my invention these difficulties are overcome, without materially interfering with the working of the furnace, by cutting off, or diverting the supply of secondary air at intervals, so as to interrupt the normal introduction of this air at the bottom of furnace, whence it ascends with the effect of cooling the lower part of the furnace wall and deflecting the flames upwards from the burners. During these intervals I may continue the supply of secondary air, but divert the same so that this air flows through the burners into the furnace chamber.

Apparatus according to my invention is shown in the accompanying drawing, in which—

Figs. 1 and 2 are diagrammatic vertical sections of a powdered fuel furnace, the former illustrating the normal condition of working, and the latter illustrating the condition when the secondary air is diverted, the flow of air being in each case indicated by arrows.

Fig. 3 is a longitudinal section of one of the burners, to a larger scale, and

Fig. 4 is a vertical section of the bottom of the furnace, also to a larger scale.

Referring first to Figs. 1 and 2, $a$, $a$ are burners, through which powdered fuel mixed with part of the primary air is injected into the combustion chamber $b$. There may be any convenient number of such burners. Secondary air is supplied by means of a blower $c$. There are valves $d$, $e$, $e$ in delivery pipes leading from the blower, enabling the secondary air to be directed along alternative paths.

When the valves $e$ are closed, and the valve $d$ is open, the secondary air is blown into a channel $h$ extending round the ash box $f$, and flows through openings $g$ into this box and then upwards into the combustion chamber. The air thus cools the ash in the box, and the descending ash, so that it does not melt, and ash can be removed without difficulty while the furnace is working, doors $i$ being provided for the purpose. Ash descending in a more or less melted state is granulated by the stream of air.

The ascending mixture of powdered fuel and air is uniformly distributed over the entire cross-section of the furnace chamber, and as the upward drive of the air is very slight there is ample time for combustion of the fuel, the weight of which retards its ascent. The conditions are, therefore, favorable to efficient working, except that the cooling effect of the air causes some of the ash to descend in a pasty state, and some of it is liable to adhere to the lower part of the furnace wall, as indicated at $k$. To neutralize this defect a change is made at intervals, by closing the valve $d$ and opening the valves $e$, so that secondary air is blown with considerable velocity through pipes passing through the burners $a$. This air carries the fuel farther down the furnace chamber, so that the zone of maximum temperature is lower down than when working under the conditions previously described, and the caked ash or clinker at $k$ is melted and runs down into the ash box. To prevent it from adhering to the bottom of this box a layer of granular ash is always left in this box. The duration of this mode of operation may be so regulated that a thin layer of clinker is left on the furnace wall, to protect the masonry.

The burner shown in Fig. 3 has a tubular inlet $l$ for primary air mixed with powdered fuel, leading to a bulbous enlargement, from which the mixture passes into a narrow annular channel $m$ between the burner tube and a pipe $n$ concentric therewith. The fuel mixed with primary air issues, accordingly, from an annular orifice, and is well distributed and spread when it encounters the ascending stream of secondary air admitted at the bottom of the furnace. The pipe $n$ is a pipe through which secondary air flows when the valves $e$ are opened and the valve $d$ is closed. The secondary air then operates with an injector effect, forcing the fuel and primary air mixture downwards in the furnace, and owing to the expansion of the secondary air by heat the same also becomes intimately mixed with the fuel.

It has previously been proposed to deflect the flame downwards, at intervals, by means of a steam blast, for the purpose of detaching clinker which adheres to the furnace wall, the clinker being then washed away by water, but this involves introducing steam and water, which interfere with the normal working of the furnace, and each such operation must be very brief, as otherwise the furnace temperature will be unduly lowered. This method is also liable to be injurious to the masonry. It will be noted that with my improved method no foreign matter is introduced into the furnace. The secondary air, which normally enters at the bottom of the furnace, distributed about the circumference thereof, assisting in the upward deflection of the flame and to some extent insulating the furnace wall from the heat, is merely diverted, so that it drives the flame downwards, and increases the rate and pressure of the fuel injection, the insulating effect referred to being at the same time removed.

To reduce risk of obstruction of the air inlets $g$ by clinker I make the furnace wall overhang these inlets and form a kind of curtain $o$ in front of the same, as best shown in Fig. 4, this curtain tapering to a sharp edge at the bottom. The issuing air, or most of it, strikes this curtain and is dispersed thereby, so that it is fairly uniformly distributed about the circumference of the box $f$ when it flows round the edge of the curtain and ascends. When the clinker at $k$ is melted and trickles down, the curtain keeps it clear of the orifices $g$, and prevents obstruction thereof. It has been proposed heretofore to place the air-inlet orifices in a recess under a shoulder of the furnace wall, to protect them from descending clinker, but the curtain which I have described is more effective.

What I claim as my invention and desire to secure by Letters Patent of the United States is:—

In a powdered fuel furnace the combination of a furnace chamber having secondary air inlets near the bottom thereof, inclined slagging walls above said inlets, inclined burners above said walls directed to discharge, respectively along the upper surfaces thereof, each of said burners having a tube for injecting primary air and fuel into said chamber and a secondary air pipe within said tube, a blower, delivery conduits connecting said blower to said inlets near the bottom of the chamber and to said pipes within the burners, and valves controlling said conduits whereby air propelled by the blower is delivered to said inlets and said pipes alternatively.

In witness whereof I have signed this specification.

CARL HUFSCHMIDT.